(12) United States Patent
Mount et al.

(10) Patent No.: US 6,272,337 B1
(45) Date of Patent: Aug. 7, 2001

(54) TESTING A MOBILE COMMUNICATIONS SYSTEM

(75) Inventors: H. Brent Mount, Dallas; Blaine D. Cavasso; Kristen J. Smith, both of Plano, all of TX (US); Jeffrey P. Cassanova, Hiram, GA (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/312,950

(22) Filed: May 17, 1999

(51) Int. Cl.[7] ....................................................... H04Q 7/20
(52) U.S. Cl. ............................ 455/423; 455/67.4; 455/446
(58) Field of Search ................................. 455/67.1, 67.4, 455/423, 424, 425, 446, 226.1, 226.2, 456, 457; 379/1, 10, 29

(56) References Cited

U.S. PATENT DOCUMENTS

| | | | |
|---|---|---|---|
| 5,828,962 | * 10/1998 | Ho-A-Chuck | 455/446 |
| 5,875,400 | 2/1999 | Madhavapeddy et al. . | |
| 5,884,177 | 3/1999 | Hanley . | |
| 5,943,014 | * 8/1999 | Gilhousen | 455/456 |
| 5,953,669 | * 9/1999 | Stratis et al. | 455/446 |
| 5,983,106 | * 11/1999 | Bernardin et al. | 455/446 |
| 6,006,089 | * 12/1999 | Sasaki et al. | 455/423 |
| 6,052,583 | * 4/2000 | Bernardin | 455/423 |
| 6,088,582 | * 7/2000 | Canora et al. | 455/226.1 |
| 6,119,010 | * 9/2000 | Labedz | 455/446 |
| 6,169,896 | * 1/2001 | Sant et al. | 455/424 |

OTHER PUBLICATIONS

CDMA Development Group, "Multiple Access Wireless Communications"; pp. 1–3; dated at least as early as Mar. 24, 1999 and printed from http://www.cdg.org/tech/a$_{13}$ ross/MultipleAccess.html.

* cited by examiner

*Primary Examiner*—Nay Maung
(74) *Attorney, Agent, or Firm*—Trop, Pruner & Hu, P.C.

(57) ABSTRACT

A method and apparatus testing a mobile communications system includes a test control system, real mobile units, and an attenuator matrix controllable by the test control system to vary strengths of signals transmitted by the mobile units for receipt by the mobile communications system. By varying the attenuation of the signals communicated between the mobile units and the mobile communications system, the mobile units may be made to appear to be moving to the mobile communications system. Movement patterns of the mobile units may be stored in the test control system to control attenuation in the attenuator matrix.

27 Claims, 8 Drawing Sheets

TESTING A MOBILE COMMUNICATIONS SYSTEM

BACKGROUND

The invention relates to testing mobile communications systems.

In a mobile communications system, such as cellular or personal communications services (PCS) systems, mobile telephones communicate through nearby radio base stations and a mobile switching center. The switching center can connect a mobile telephone to another wireless telephone or to a wired telephone through a public switched telephone network (PSTN).

A cellular or PCS system is made up of a number of cells each with a base station having transmitting and receiving antennas. Mobile telephones in the cells can request access by transmitting predetermined messages through control channels to the mobile switching center. Access to the system can then be provided to the mobile telephone on an available voice channel. In addition, as a mobile telephone moves from one cell to another, the mobile switching center handles hand-off of the mobile telephone from one cell to another.

The mobile switching center may be run under control of switching software to handle accesses by mobile telephones, store locations of mobile telephones as they move between cells, and handle hand-offs of mobile telephones between cells. During development of components (both hardware and software) of mobile switching centers in a mobile communications system, various types of tests may be performed to determine whether the components are operating properly. Such tests may be performed using software simulation of certain parts of a mobile communications system, which may include software emulation of mobile units and base stations. To test actual operation of a system, one or more mobile telephones may be physically moved within a cell and between cells to test access and hand-off capabilities of the mobile switching center.

With conventional test techniques, however, the number of real mobile telephones and movement patterns may be limited since one or more mobile telephones have to be physically moved around in a cell and between cells. The personnel and equipment needed to physically move the mobile telephones may be costly. In addition, it may be time consuming to move real mobile telephones around in a geographic area covered by a mobile communications system, which may further increase costs associated with testing.

Thus, a need exists for an improved method and apparatus for testing a mobile communications system.

SUMMARY

In general, according to one embodiment, a simulation system for testing a mobile communications system includes a controller and a plurality of mobile units. A signal processing device is controllable by the controller to vary strengths of signals transmitted by the mobile units for receipt by the mobile communications system to simulate movement of the mobile units.

Some embodiments of the invention may include one or more of the following advantages. Varying strengths of transmitted signals of mobile units to simulate their movement allows greater flexibility in testing mobile communications systems. It may be possible to test a larger number of mobile units and to provide more movement patterns of the mobile units. Costs associated with testing may be reduced since simulation of mobile unit movement removes the need for having to actually physically move mobile units along desired paths during testing. Greater accuracy in test results may also be obtained by increasing the number of mobile units and movement patterns in a test of a mobile communications system.

Other features and advantages will become apparent from the following description and from the claims.

DETAILED DESCRIPTION

In the following description, numerous details are set forth to provide an understanding of the present invention. However, it is to be understood by those skilled in the art that the present invention may be practiced without these details and that numerous variations or modifications from the described embodiments may be possible. For example, although the description refers to testing of mobile communications systems such as cellular and personal communications services (PCS) systems, it is contemplated that test methods and apparatus according to further embodiments may be used with other types of wireless communications systems.

Figure 1A:
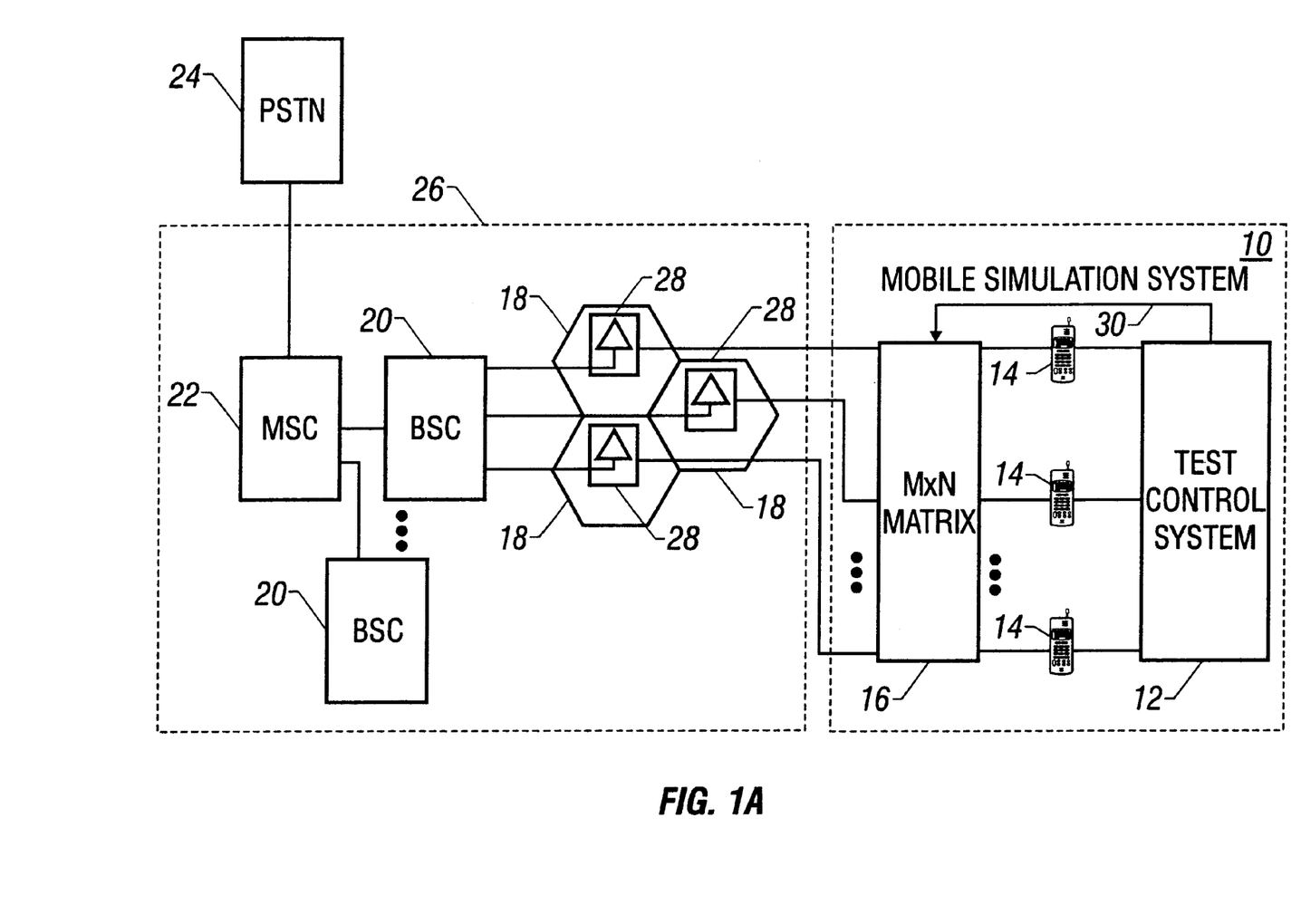
FIG. 1A illustrates an embodiment of a mobile simulation system for testing a mobile communications system.

Referring to FIG. 1A, a mobile communications system 26 (which may be an analog or digital cellular system or PCS system, for example) includes a number of cells 18 each having a base transceiver station 28. Each base transceiver station 28 may include a relatively low-power, multichannel radio transceiver adapted to communicate with mobile units within a cell by radio frequency (RF) or other types of wireless signals. The base transceiver stations 28 may be coupled to a base system controller (BSC) 20, which in turn may be coupled to a mobile switching center (MSC) 22. Multiple BSCs 20 (each associated with a group of cells 18) may be present in the mobile communications system 26. In an alternative arrangement, the base transceiver stations 28 may be directly coupled to the MSC 22 instead of through BSCs 20. Other types of systems 26 may have other different arrangements.

The MSC 22 is adapted to switch calls between mobile units (e.g., mobile telephones or other types of systems or devices capable of mobile communications, such as portable or hand-held computers or devices). The MSC 22 can also switch calls between a mobile unit and a local telephone coupled through a public switched telephone network (PSTN) 24. In addition, the MSC 22 controls hand off so that a mobile unit leaving one cell switches automatically to a channel in the next cell. The MSC 22 receives reports from the base transceiver station 28 on the signal strength of each mobile unit transmitting within the coverage area. From this information, the MSC 22 can decide which of the cells 18 is the appropriate one for each active mobile unit.

To test the MSC 22, the BSCs 20, and other system components in the mobile communications system 26, a mobile simulation system 10 according to one embodiment of the invention may be operatively coupled to base transceiver stations 28 in selected cells 18. According to embodiments of the invention, the mobile simulation system 10 includes actual or real mobile units 14 (e.g., mobile telephones or other mobile communications units) that are capable of requesting access to, and communicating in, the mobile communications system 26. The mobile simulation system 10 is capable of manipulating the mobile units 14 so that call processing testing may be performed. Effectively, the real mobile units 14 provide the interface from the mobile simulation system 10 into the mobile communications system 26.

The mobile units 14 are coupled to an attenuator matrix 16, which may be configured as an M×N matrix of attenuators (e.g., RF attenuators). Although illustrated with one attenuator matrix 16, more than one attenuator matrix can be included in the mobile simulation system 10 to connect to more mobile units 14 and more base transceiver stations 28. A first set of cell ports of the M×N attenuator matrix 16 is adapted to connect to M number of base transceiver stations 28 and a second set of mobile ports is adapted to connect to N number of mobile units 14. The matrix 16 provides a cross-connected box that has M×N number of attenuators connecting each of the cell ports to each of the mobile ports.

Figure 1B:
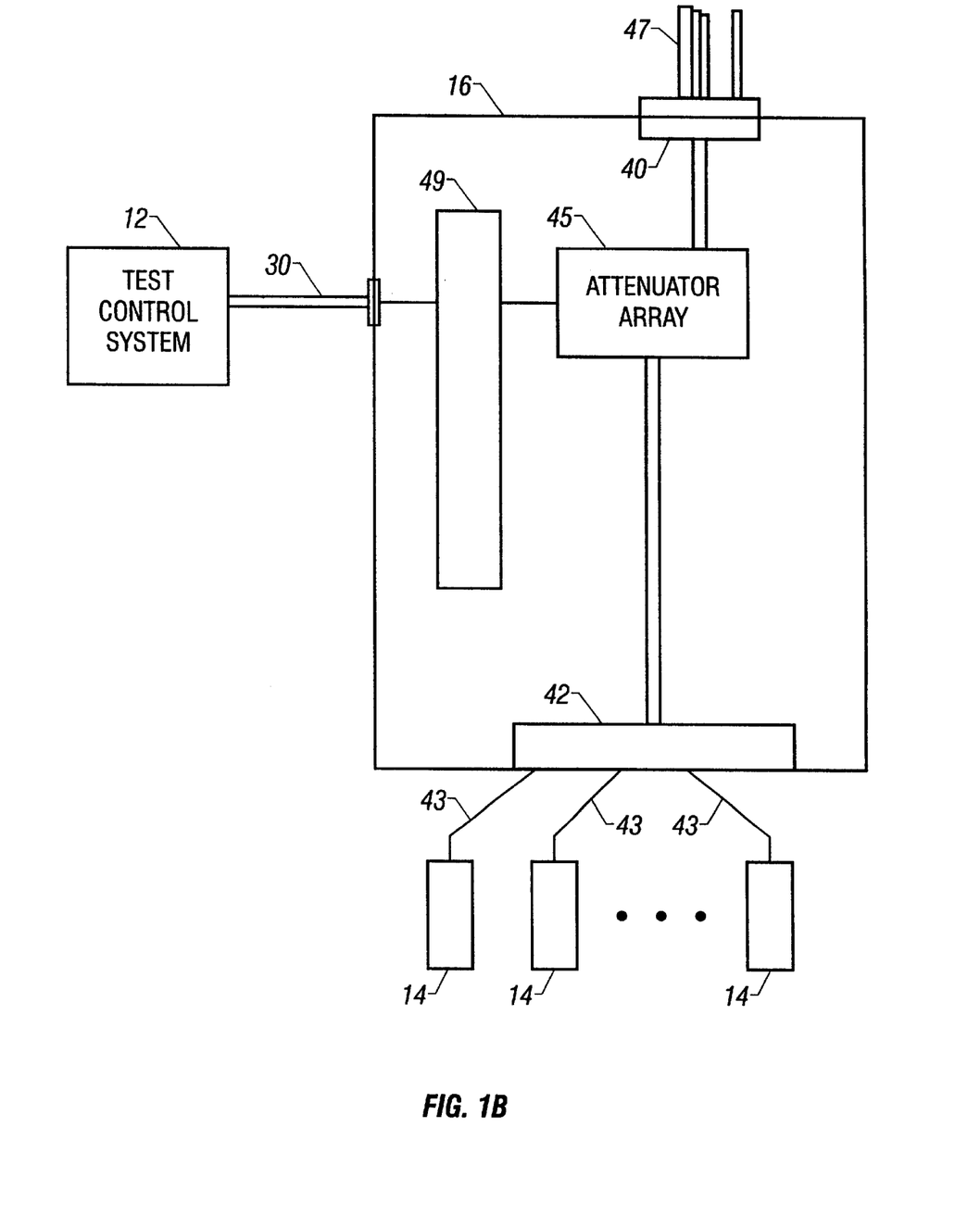
FIG. 1B is a block diagram of mobile units, a test control system, and an attenuator matrix in the mobile simulation system of FIG. 1A.

Referring further to FIG. 1B, the mobile units 14 are coupled to a first set of mobile ports 42 over wired links 43, which may be coaxial cable links in one embodiment. According to one embodiment, the antennas of the mobile units 14 may be removed and substituted with a coaxial cable connector to carry RF signals to and from the mobile units 14. The mobile ports 42 may include N-type connectors, for example, that allow coaxial cables (or other suitable wires and cables) connected to the antenna ports (or other wireless ports) of the mobile units 14 to connect to an array of attenuators 45 for a closed-loop connection. Depending on the type of mobile unit 14 and type of mobile communications system 26, the RF signals may be in analog format or digital format, e.g., code division multiple access (CDMA) or time division multiple access (TDMA). The other side of the attenuator array 45 is coupled to a second set of cell ports 40, which are connected to antennas 47 for wireless communications with base transceiver stations 28. A parallel I/O circuit 49 (which may include some type of controller) is adapted to receive control signals from the test control system 12. The output of the parallel input/output (I/O) circuit 49 is provided to control the array of attenuators 45.

In other embodiments, devices other than attenuators may be used to vary strengths of signals transmitted by the mobile units 14. For example, instead of the attenuator matrix 16, another type of signal processing device, which may include amplifiers, attenuators, filters, or other types of circuits, may be coupled to the mobile units. In addition, the signal processing device may be an analog or digital device. In some embodiments, the signal processing device may also be implemented in software.

By manipulating the attenuation values of the RF links (through the attenuator matrix 16) between the mobile units 14 and base transceiver stations 28, the MSC 22 senses the mobile units 14 as moving when in fact they may be stationary. Thus, with the attenuator matrix 16, apparent movement patterns of the mobile units 14 can be controlled by the mobile simulation system 10. In addition, obstructions such as buildings or other structures may also be simulated by varying the attenuation of the RF signals.

Each of the mobile units 14 is coupled to a test control system 12 through its I/O port (e.g., serial port or other type of available interface). In one embodiment, the test control system 12 is adapted to send commands to the mobile units 14 to access the mobile communications system 26. In response to such commands, the mobile units 14 can issue a standard access request to the mobile communications system 26. Once a mobile unit 14 is connected to the mobile communications system 26, the test control system 12 can further command the mobile units to dial predetermined numbers, and in some embodiments, to send voice data so that voice communications between mobile units 14 through the MSC 22 can be tested.

The test control system 12 controls connection and termination of calls between the mobile units 14 and the mobile communications system 26. Further, in some embodiments, the test control system 12 may include elements (implementable with software and/or hardware) that are capable of generating and receiving voice data so that the mobile units 14 can be controlled to communicate voice data with one another.

The attenuator matrix 16 is controllable by the test control system 12 to attenuate RF signals transmitted by each of the mobile units 14 so that the base transceiver stations 28 receive attenuated RF signals from the mobile units 14. By varying the attenuation in the matrix 16, a mobile unit 14 may be made to appear to be moving in a cell 18. In addition, the attenuator matrix 16 can be controlled so that the signal strength of a given mobile unit 14 is made to appear weakening in one cell and increasing in strength in another cell 18. Thus, the mobile unit 14 can be made to appear to be moving from one cell 18 to another cell 18. All this may be done while the mobile units 14 are in fact stationarily positioned, such as in a laboratory or other location. The mobile simulation system 10 may also be portable so that the simulation system 10 can be moved to different sites for testing different parts of the mobile communications system 26.

Using the mobile simulation system 10, more movement patterns and greater numbers of mobile units may be tested as compared to conventional test systems. Flexibility in testing is increased since any number of arbitrary patterns may be run by controlling the attenuator matrix 16 to provide different movement patterns of the mobile units 14. As new components are installed into the mobile communications system 26, such components can be quickly and conveniently tested using the mobile stimulation system 10 according to some embodiments. By increasing the number of mobile units 14 in the mobile simulation system 10, the performance threshold of the mobile communications systems 26 (including the MSC 22 and BSC 20) can be tested, including its ability to handle large numbers of access requests and maximum capacity for concurrent calls. Further, large numbers of mobile units 14 may be controlled to have different movement patterns in a multi-hour test session to simulate actual traffic conditions. Thus, a wireless test system that includes real mobile units is provided to more accurately test a mobile communications system.

Figure 2:
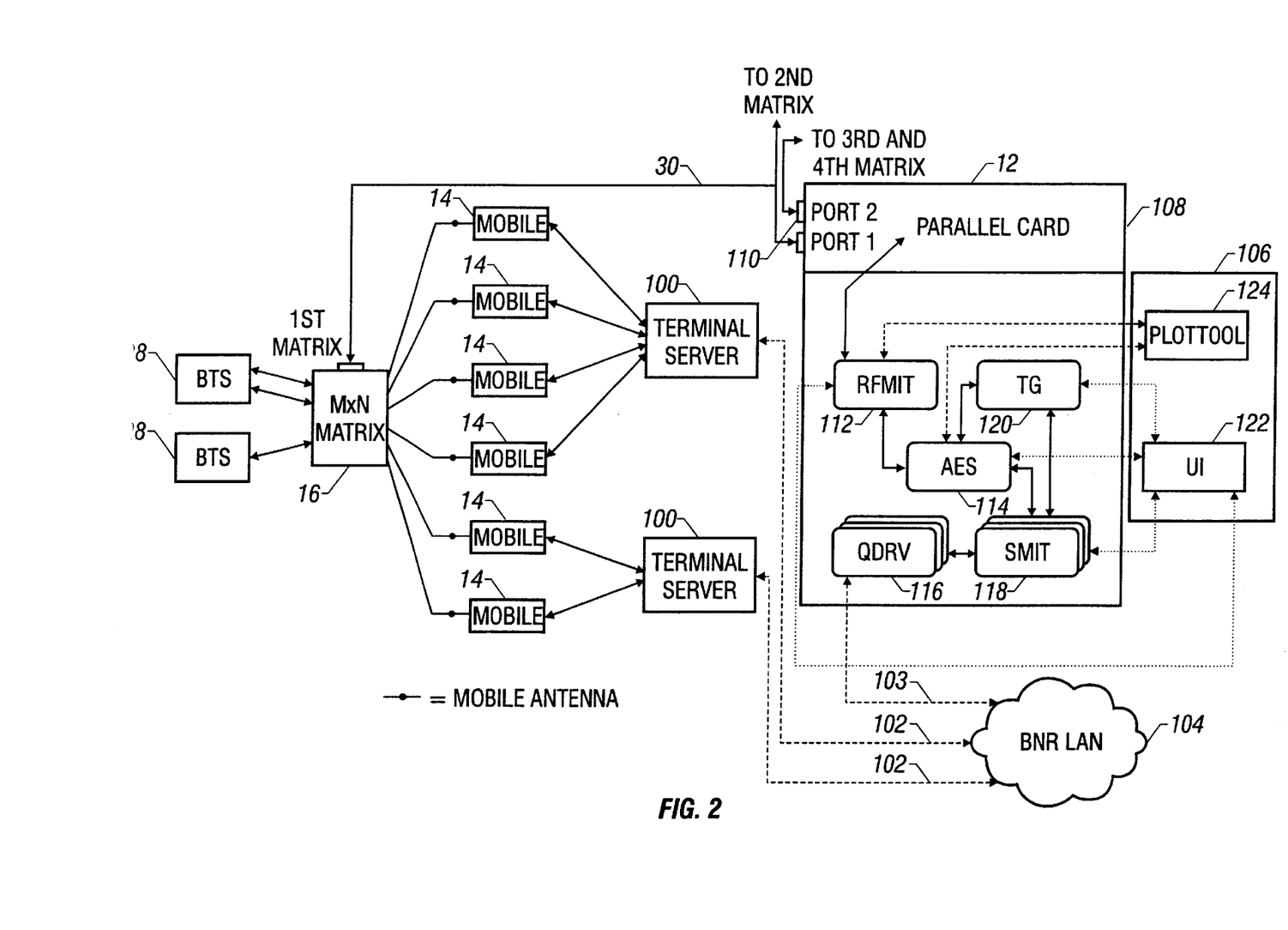
FIG. 2 is a block diagram of the mobile simulation system of FIG. 1A according to one embodiment of the invention.

Referring to FIG. 2, the mobile simulation system 10 is illustrated in greater detail. In one example embodiment, the test control system 12 may be implemented on a platform including Versabus Module European (VME) card cages, which may contain single board computers (SBCs). In addition, the VME card cages may include an I/O board having I/O interfaces including SCSI (Small Computer System Interface) ports, network ports, and other ports and interfaces. Test control software routines according to some embodiments may be run on the multiple SBCs. A parallel card 108 in the test control system 12 may provide ports that connect to one or more control lines 30 to the attenuator matrix 16. In further embodiments, other platforms (which may be uniprocessor or multiprocessor systems) may be used to implement the test control system 12. Such platforms may generally be referred to as controllers in this description.

The test control system 12 may also be coupled to a local area network (LAN) 104 over a link 103 (e.g., an Ethernet link). The LAN 104 may also be coupled by links 102 to terminal servers 100 that are in turn coupled to I/O ports of the mobile units 14. Each terminal server 100 includes an interface for converting signals between the I/O format (e.g., serial format) of the mobile units and the format of the communications links 102 (e.g., Ethernet link). The number of mobile units 14 and base transceiver stations 28 shown in FIG. 2 are for illustrative purposes only, as they may be varied depending on the number of ports available in the attenuator matrix 16 and the number of attenuator matrices 16 included in the mobile simulation system 10.

In the illustrated embodiment, several different software tasks are executable in the test control system 12. It is to be understood, however, that the operations performed by the illustrated tasks may be integrated into fewer tasks or shared among more tasks. Further, such tasks may be run on multiple platforms. A first task may be an RF matrix interface task (RFMIT) 112 designed to control the attenuator matrix 16 through the parallel card 108. More than one RFMIT 112 can run in the test control system 12 if multiple attenuator matrices are coupled to the test control system 12. Another task in the test control system 12 is the queue driver (QDRV) 110 that provides an interface between a serial mobile interface task (SMIT) 118 and one of the mobile units 14 through the LAN 104. In one embodiment, there may be as many QDRV tasks 116 as there are mobile units 14; alternatively, one QDRV task 16 may be adapted for communicating with multiple mobile units 14. The SMIT 118 is responsive to instructions (e.g., to initiate, answer, or terminate calls) from other tasks in the test control system 12 to perform the requested operations by issuing corresponding commands through the QDRV task 116 and the LAN 104 to one or more mobile units 14. The SMIT 118 is adapted to receive instructions from a traffic generator (TG) task 120. In one embodiment, one SMIT 118 corresponds to each mobile unit 14. In an alternative embodiment, one SMIT 118 can control multiple mobile units 14, with different SMITs 118 being employed for different types of mobile units 14 (e.g., units of different models or from different manufacturers). Different SMITs 118 may also be provided to support analog and digital mobile systems (e.g., TDMA or CDMA digital systems).

The traffic generator (TG) task 120 "simulates" a mobile subscriber by directing a mobile unit 14 to make and answer calls. Calls may be made according to test case scenarios provided by a user, which may describe a traffic environment for testing. During traffic testing, the TG task 120 issues instructions to step through normal stages of call setup, conversation, and call termination, according to test cases provided to the TG task 120.

An air emulation system (AES) task 114 is also included in the test control system 12 according to one embodiment. The AES task 114 primarily manages movement of the mobile units 14 to control positions of the mobile units 14. Thus, the AES task 114 can control moving mobile units 14 along directed paths at varying speeds, for example. In addition, the AES task 114 is able to emulate the air environment, including emulation of physical obstructions such as buildings and other structures.

A user interface (UT) task 122 (which may be run on a separate workstation 106 or in the test control system 12) provides a graphical user interface through which an operator may configure the test control system 12, monitor test results, and perform various control operations. Multiple user interface tasks may be run on multiple workstations in some embodiments to allow more than one operator access to the mobile simulation system 10 for performing tests. Graphical representations of mobile units 14 (referred to as graphical mobiles) are accessible from the user interface task 122. Using such graphical mobiles, a call from one mobile unit 14 to another mobile unit 14 can be made and mobile units 14 may be monitored while traffic is running in the test system 12. The user interface task 122 also allows an operator to configure movement patterns of the mobile units 14 during testing. In addition, another user task, referred to as a plottool task 124, may be provided to monitor movement of mobile units 14 during testing.

Movement pattern information (stored in a storage device in the test control system 12) of the mobile units 14 may be provided by the user interface task 122 to the AES task 114. Thus, through the user interface task 122, an operator can manipulate movement of mobile units 14, which are translated into attenuation commands sent over control lines 30 to the attenuator matrix 16 by the AES task 114 through the RFMIT 112. In addition, the TG task 120 can provide instructions based on test cases to the AES task 114 to perform traffic testing.

Figures 3, 4:
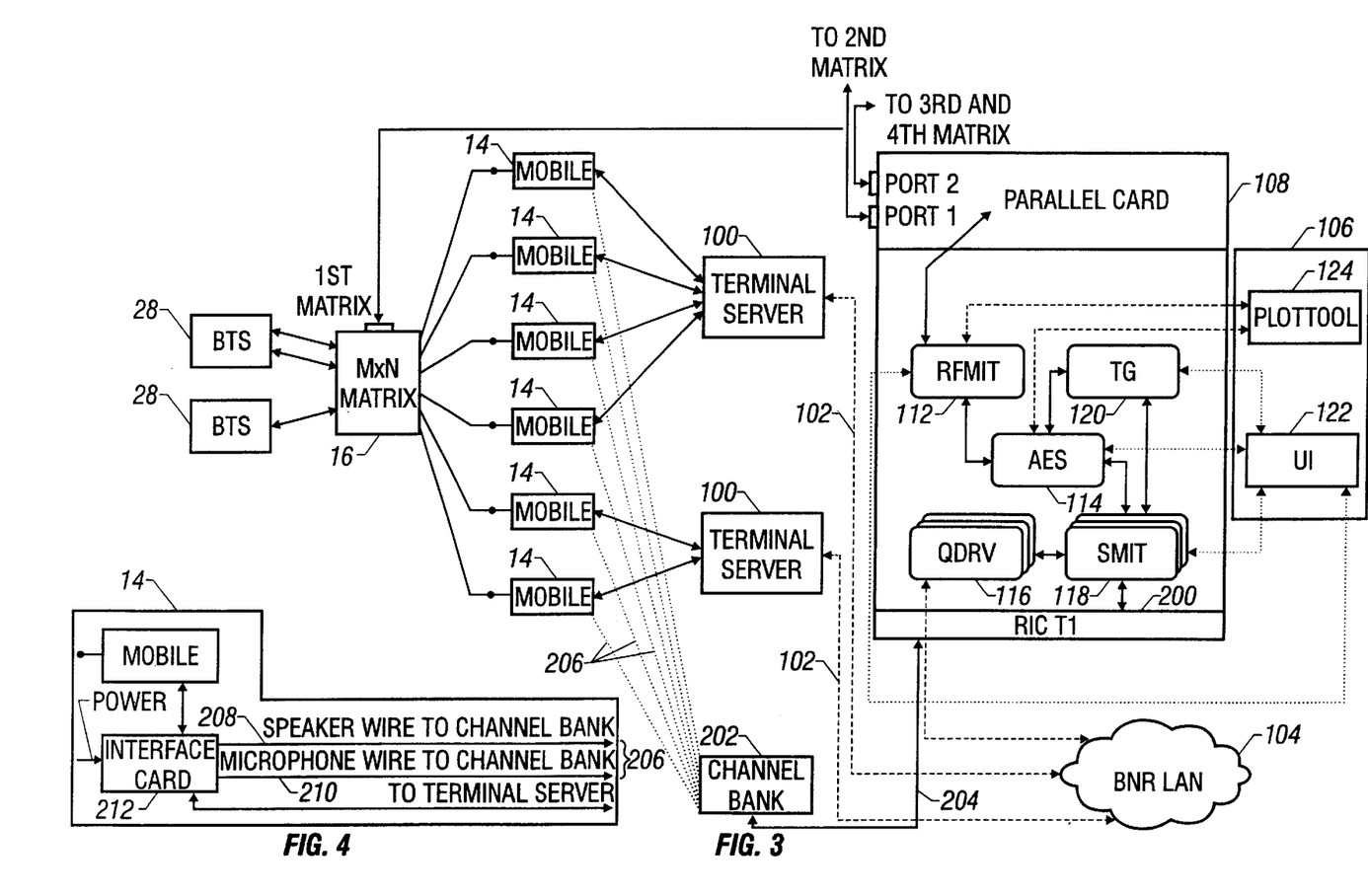
FIG. 3 is a block diagram of the mobile simulation system of FIG. 1A according to another embodiment of the invention.
FIG. 4 is a block diagram of an interface card in a mobile unit in the mobile simulation system of FIG. 3.

Referring to FIG. 3, a mobile simulation system 10 according to another embodiment is illustrated. The test control system 12 in the FIG. 3 embodiment has speech capability. In this embodiment, a radio interface card 200 includes circuitry to perform tone generation and detection. The radio interface card 200 can generate voice data to be communicated by a mobile unit 14 and receive voice data from a mobile unit 14. This allows the test control system 12 to perform actual voice communications between two mobile units 14 in which voice generated by the radio interface card 200 is transferred to a first mobile unit 14 to be communicated through the attenuator matrix 16 and a base transceiver station 28 to the MSC 22. The voice data may be received by a second mobile unit 14, with the received voice data in the second mobile unit 14 transferred to the radio interface card 200 for processing by the test control system 12.

The radio interface card 200 is coupled to a channel bank 202 over a communications link 204, which may be T1 or E1 link, for example. The channel bank 202 is coupled to an I/O port of each mobile unit 14 over links 206. As further illustrated in FIG. 4, each link 206 includes a speaker wire 208 and a microphone wire 210 that are both coupled to an interface card 212 that is inside each mobile unit 14. The interface card 212 also provides a link to a terminal server 100.

Voice data from the radio interface card 200 is transmitted through the channel bank 202 and over a microphone wire 210 to the interface card 212 of a mobile unit 14. Voice received by a mobile unit 14 is transferred from the interface card 212 over a speaker wire 208 and through the channel bank 202 to the radio interface card 200. The channel bank 202 is effectively an interface to convert between T1 (or E1) signals on link 204 and the speaker and microphone wire signals (digitized voice data) on links 206.

The voice data transferred over the link 204 between the radio interface card 200 and the channel bank 202 may be time multiplexed, with voice associated with different mobile units 14 transferred in different time slots. The radio interface card 200 is controlled by the one or more SMITs 118. Voice data received by the radio interface card 200 is communicated to the one or more SMITs 118 for processing (e.g., such as to compare output voice data to input voice data and to determine timings of such input and output voice data).

Figure 5:
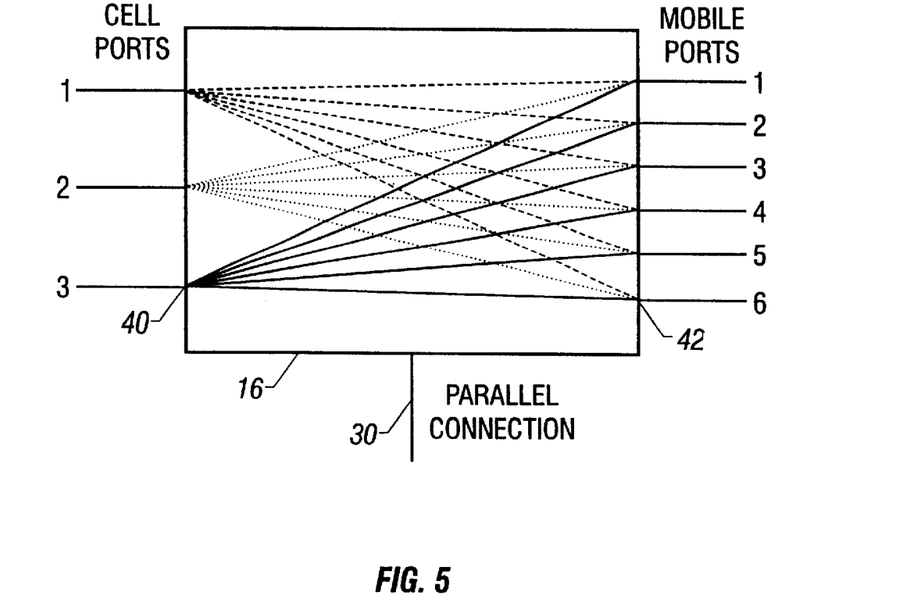
FIG. 5 illustrates an attenuator matrix according to one embodiment for use in the mobile simulation system of FIG. 2 or 3.

Referring to FIG. 5, the attenuator matrix 16 includes a cross-connected box of M×N number of attenuators, each represented as lines connecting cell ports 40 to mobile ports 42. Example attenuators that may be used are programmable attenuators provided by JFW Industries, Inc., although other types of attenuators may also be used. Each attenuator in the matrix 16 may be adapted to operate in a frequency range between about 800 and 2,000 megahertz (MHz). Most commercial cellular and PCS systems operate within the stated range. However, it is contemplated that, in further embodiments, the attenuators may be made to operate at higher or lower frequencies.

Each connection between a cell port 40 and a mobile port 42 contains its own attenuator. In the example illustrated in the FIG. 5, which shows a 3×6 matrix, 18 connections (and thus 18 attenuators) exist between the cell ports 40 and mobile ports 42 in the matrix 16.

The mobile simulation system 10 controls attenuation of the RF link between a mobile unit 14 and a base transceiver system 28 with the attenuator matrix 16. Adjusting the attenuation simulates the distance of a mobile unit 14 from an antenna of a base transceiver system 28. When the mobile simulation system 10 gradually increases or decreases the attenuation of RF signals, the MSC 22 perceives the mobile units 14 as moving (even though the mobile units 14 may not actually have moved).

Figure 6:
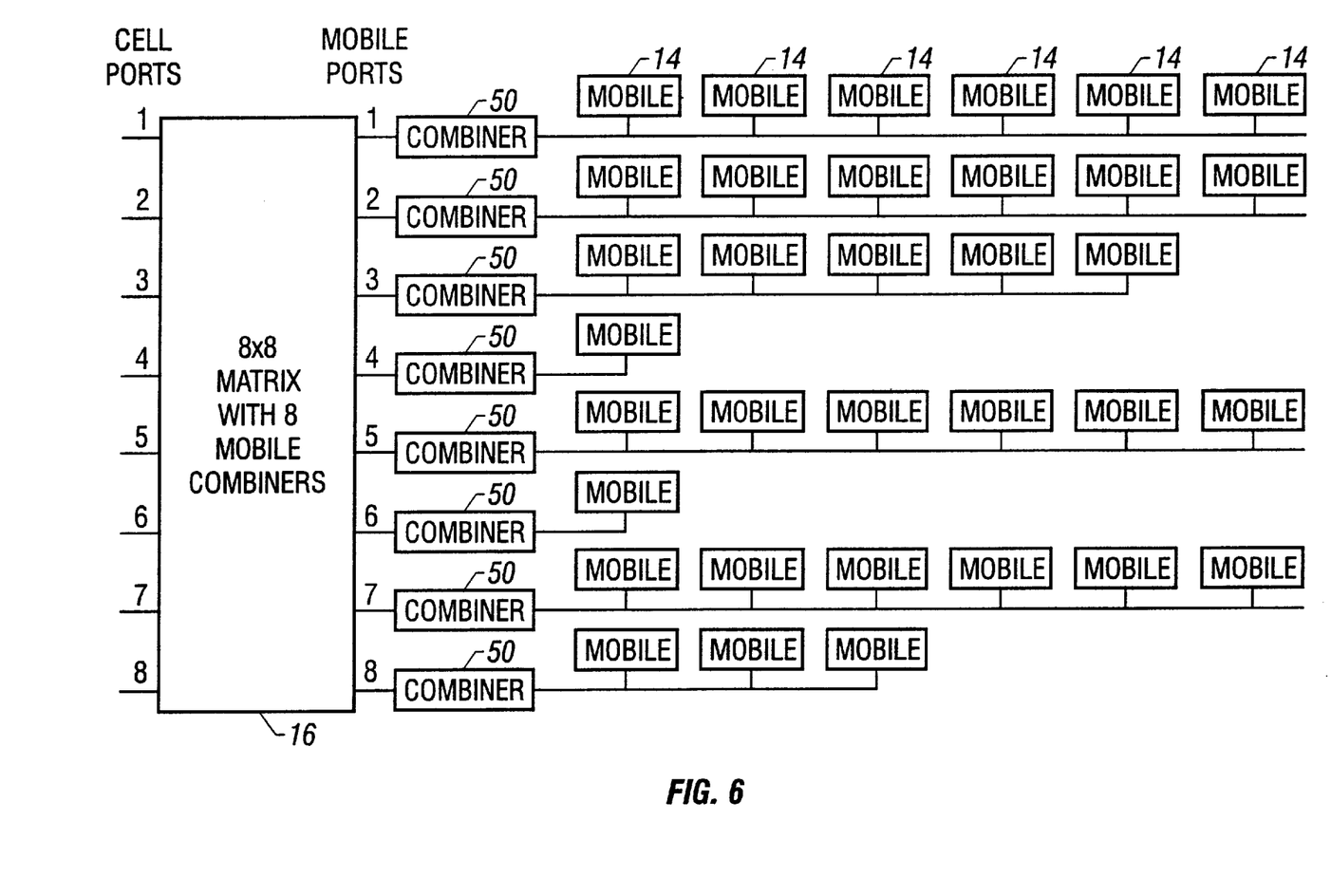
FIG. 6 illustrates the attenuator matrix of FIG. 5 used with combiner units to allow more than one mobile unit to be attached to each port of the attenuator matrix.

According to a further embodiment, the matrix 16 may allow more than one mobile unit to be attenuated on the same mobile port 42. Referring to FIG. 6, this may be performed by using a combiner unit 50 to which multiple mobile units 14 are connected to. Each combiner unit 50 is basically a splitter that provides a 1-to-N connector (e.g., an SMA connector) which takes a single signal on one side and splits it into N signals on the other side of the unit. The connector provides a bi-directional signal link in which a signal is split in one direction and signals are combined in the opposite direction.

Using multiple combiner units 50 as illustrated in FIG. 6, with many connected to multiple mobile units 14, a greater amount of traffic can be generated during testing. In one embodiment, movement of multiple mobile units 14 attached to a combiner unit 50 involves moving all the mobile units 14 along the same patterns and at the same speed.

Figure 7:
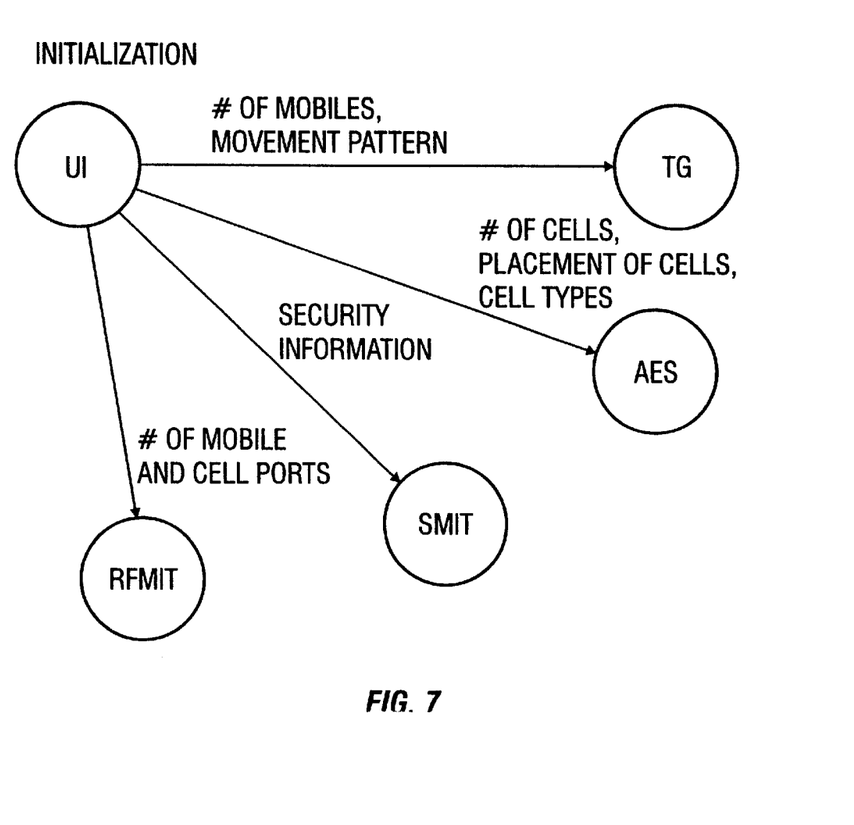
FIG. 7 illustrates operations performed by the mobile simulation system of FIG. 2 or 3 during initialization.
Figure 8:
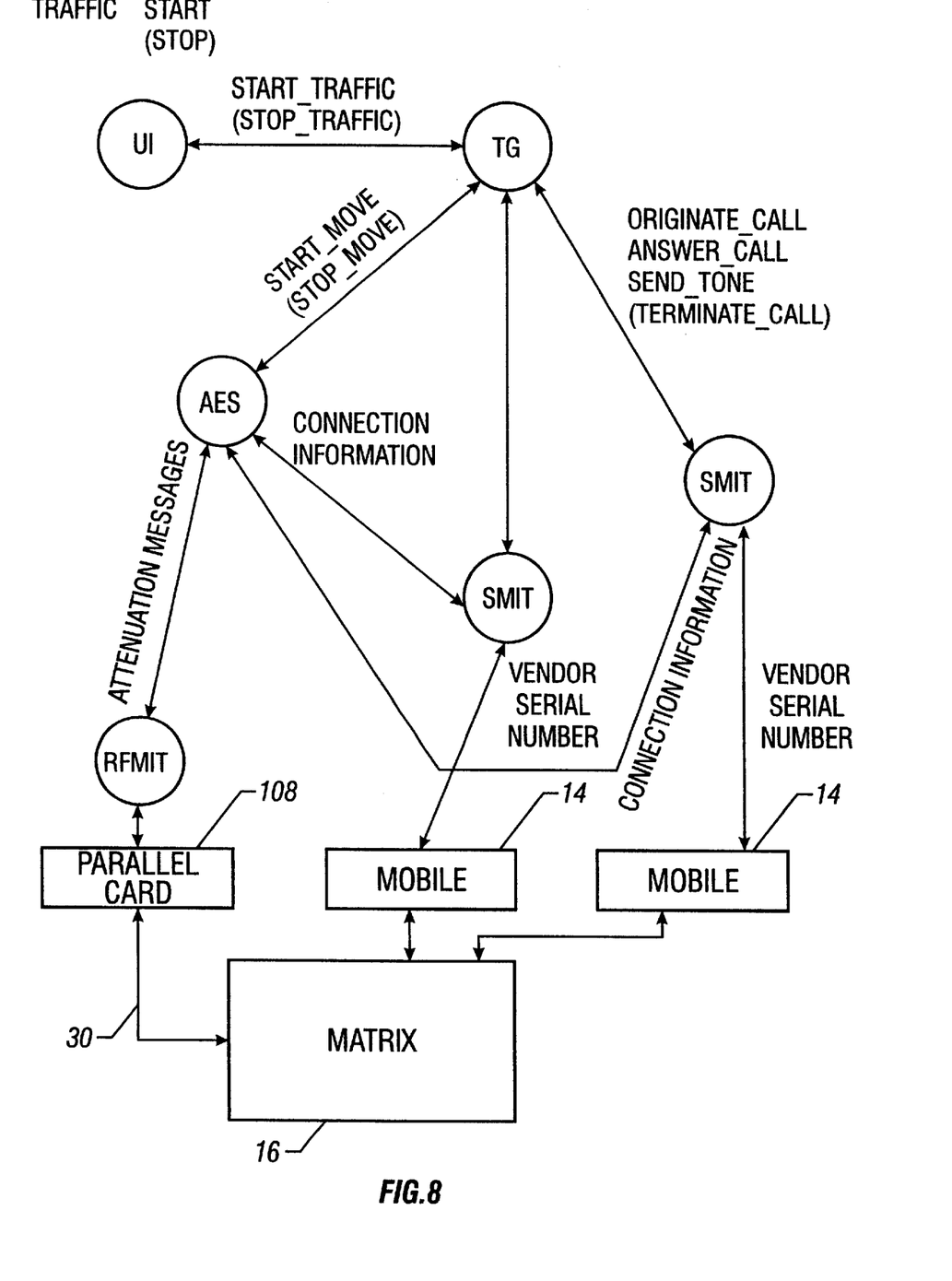
FIG. 8 illustrates operations performed by the mobile simulation system of FIG. 2 or 3 during test operations.

Referring to FIGS. 7–8, flows between the various software tasks in the test control system 12 during test operations are illustrated. Operations may be performed in the form of messaging between tasks of the test control system 12. FIG. 7 illustrates the initialization of the test control system 12. From the user interface task 122, the number of mobile units and movement patterns and speeds may be specified (either by an operator or using default settings) and provided to the TG task 120. Also during initialization, the user interface task 122 provides the number of cells, placement and locations of cells, and cell types to the AES task 114. Further, the user interface task 122 may provide security information to the SMIT 118 and the number of mobile and cell ports of the attenuator matrix 16 to the RFMIT 112.

After initialization, traffic may be started. As illustrated in FIG. 8, this may be started by the user interface task 122 issuing a Start_Traffic message to the TG task 120. In response, the TG task can then send a Start_Move message to the AES task 114 to request that the AES task 114 start the movement of mobile units 14. Depending on test cases entered by one or more operators, the TG task 120 may also issue various operations to be performed by the mobile units 14 by sending corresponding messages to SMITs 118. In one embodiment, one SMIT 118 may be provided for each mobile unit 14. For example, such messages may include the following: Originate_Call (to originate a call through the MSC 22); Answer_Call (to answer an incoming call, either from another mobile unit 14 or from some other source); and Tone_Send (to send a tone, such as that associated with pressing of a numeric key on the mobile unit 14).

The AES task 114 also provides messages containing connection information to the SMITs 118 in the test control system 12. Connection information may include the cell and sector that each mobile unit 14 is located in, services available, and so forth. The SMITs 118 transmit command messages to the mobile units 14 through respective QDRV tasks 116. The SMITs 118, in addition to the command messages, may also send vendor serial numbers of the mobile units 14. Such serial numbers may be dynamically assigned to the mobile units 14 so that different types of services may be associated with the mobile units (e.g., analog, digital, and so forth). Additionally, the serial number may be assigned so that a mobile unit 14 may be one identified to be roaming in the mobile communication system under test.

Depending on the mobile unit movement patterns that have been communicated to the AES task 114, the AES task sends messages of desired movements (in the form of attenuation messages) to the RFMIT 112. The attenuation messages may specify the amount of attenuation for each attenuator in the matrix 16. The attenuation messages are translated or converted to attenuation control signals that are sent by the RFMIT 112 to the attenuator matrix 16 to control attenuation of RF signals from the mobile units 14.

A incoming call to a mobile unit 14 is communicated by that mobile unit 14 through a terminal server 100, the LAN 104, a QDRV task 116, and an SMIT 118 to the TG task 120. In response, the TG task 120 can instruct the SMIT 118 to answer the call by issuing an Answer_Call message.

To terminate a call, a flow similar to the FIG. 8 flow may be used, with a Stop_Traffic message issued by the user interface task 122 instead of the Start_Traffic message to the TG task 120. The TG task 120 responds by issuing a Stop_Movement message to the AES task 114 as well as issuing Terminate_Call messages to the SMITs 118. The SMITs 118 convert the Terminate_Call messages into commands that may be understood by the mobile units 14 to terminate a call.

Thus, a mobile simulation system has been disclosed that includes real mobile units that are controllable by the mobile simulation system to access, and communicate in, a mobile communications system that is under test. Attenuators are adapted to receive RF signal transmissions of the mobile units through closed loop connections (e.g., coaxial cables). The attenuators (or other type of signal processing device) are controllable to vary the strengths of RF signals of the mobile units, with the attenuated RF signals communicated from antennas coupled to the attenuator matrix 16 to base transceiver stations. Variations of the attenuation of RF signals of the mobile units are performed to simulate movement of the mobile units in a cell or between cells, even though they may be stationary. Thus, using the mobile simulation system according to some embodiments, accesses to the mobile communications system can be performed while the mobile units are "moving" to emulate traffic conditions.

Figure 9:
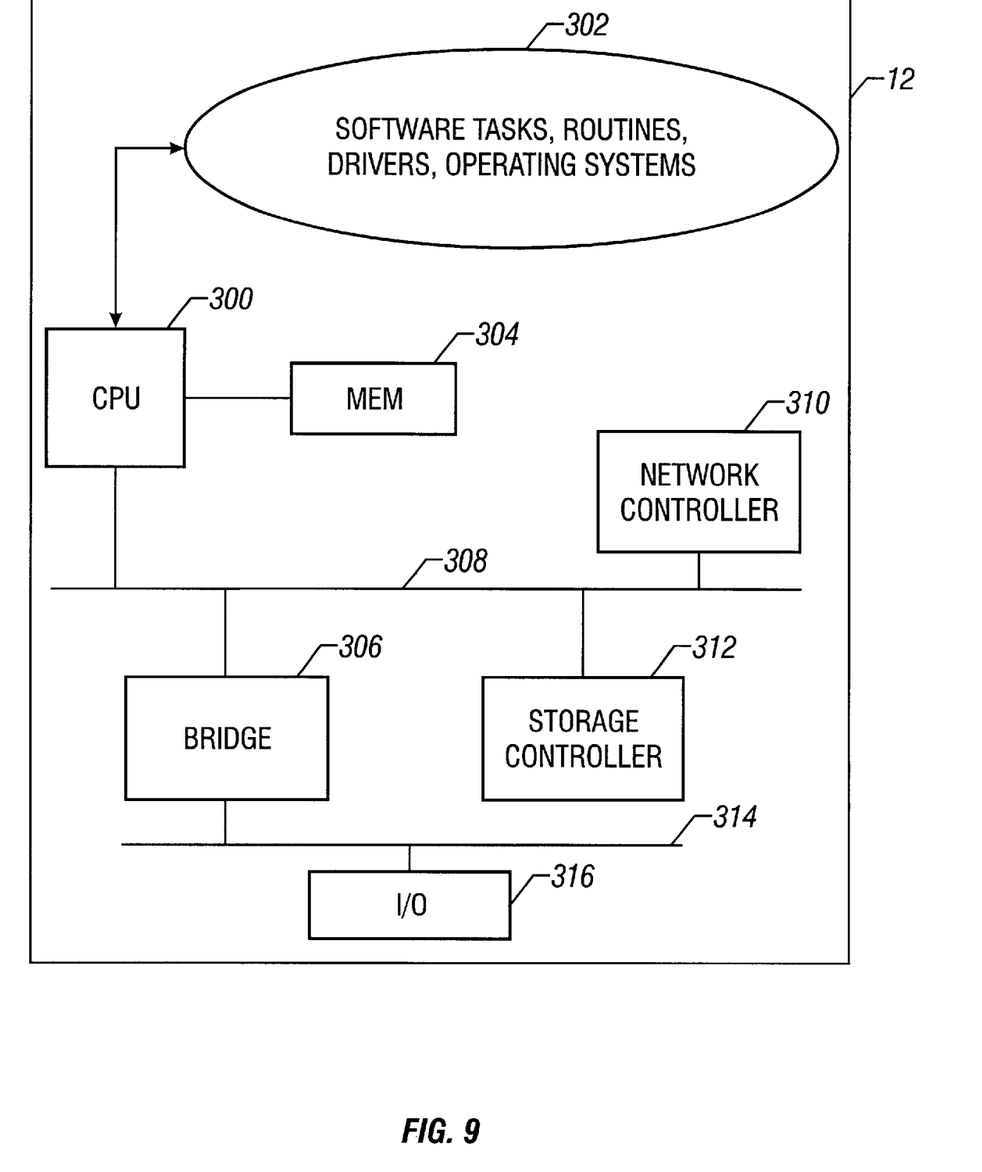
FIG. 9 illustrates an example computer in the mobile simulation system of FIG. 2 or 3.

Referring to FIG. 9, an example configuration of a controller, which may be a computer, for example, in the test control system 12 is illustrated. It is contemplated that computers or other controllers used in the test control system 12 may have other arrangements and architectures in further embodiments. A central processing unit (CPU) 300 may be coupled to a system bus 308 as well as to main memory 304. The various software tasks, routines, device drivers, and operating system, collectively referred to as 302, may be executable on the CPU 300. In a multiprocessor configuration, multiple CPUs 300 may be present in the test control system 12. Alternatively, if multiple controllers are present in the test control system 12, the components illustrated may be repeated to correspond to the multiple controllers.

A network controller 310 may be coupled to the system bus 308 for connection to a network such as the LAN 104. A bridge controller 306 may couple the system bus 308 to a secondary bus 314. One or more I/O circuits 316 may be coupled to the secondary bus 314.

The various software tasks, routines, device drivers, and operating system (generally referred to as 302) may be stored or otherwise tangibly embodied in one or more machine-readable storage media in the test control system 12. Storage media suitable for tangibly embodying software instructions may include different forms of memory including semiconductor devices such as dynamic or static random access memory, erasable and programmable read-only memories (EPROMs), electrically erasable and programmable read-only memories (EEPROMs), and flash memories; magnetic disks such as fixed, floppy and removable disks; other magnetic media including tapes; and optical media such as CD or DVD disks. The instructions stored in the one or more storage media when executed cause the system 12 to perform programmed acts.

The software can be loaded into the system 12 in one of many different ways. For example, instructions or other code segments stored on one or more storage media transported through a network interface card, modem, or other interface mechanism may be loaded into the system 12 and executed to perform programmed acts. In the loading or transport process, data signals that are embodied as carrier waves (transmitted over telephone lines, network lines, wireless links, cables and the like) may communicate the instructions or code the segments to the system 12.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A simulation system for testing a mobile communications system, comprising:
    a controller;
    a plurality of mobile units; and
    a signal processing device controllable by the controller to vary strengths of signals transmitted by the mobile units for receipt by the mobile communications system to simulate movement of the mobile units.

2. The simulation system of claim 1, wherein the controller is adapted to cause the mobile units to request access to the mobile communications system.

3. The simulation system of claim 1, wherein the signal processing device includes an array of attenuators.

4. The simulation system of claim 3, further comprising wired links coupling the array of attenuators to the mobile units.

5. The simulation system of claim 4, wherein the links include coaxial cables.

6. The simulation system of claim 4, further comprising antennas coupled to the array of attenuators, the antennas adapted to communicate with the mobile communications system.

7. The simulation system of claim 1, wherein each of the mobile units includes an input/output port coupled to the controller.

8. The simulation system of claim 7, wherein the controller is adapted to issue commands to the mobile units through respective input/output ports.

9. The simulation system of claim 8, wherein the commands include a command to request access to the mobile communications system.

10. A test system for testing a mobile communications system, comprising:
    a mobile unit having a wireless port;
    a signal processing device having a first port; and
    a cable connecting the mobile unit wireless port to the first port of the signal processing device,
    the signal processing device further including circuitry to control the strength of a signal from the mobile unit wireless port and further including a second port to communicate with the mobile communications system.

11. A system for testing a mobile communications system using real mobile units, comprising:
    a controller; and
    a storage device containing movement patterns of the mobile units,
    the controller adapted to convert the movement patterns into control signals provided to control attenuation of signals transmitted by the mobile units for receipt by the mobile communications system.

12. The system of claim 11, wherein the controller includes one or more tasks adapted to transmit a command to request access to the mobile communications system to the mobile units.

13. The system of claim 11, wherein the controller includes a component adapted to transmit voice data to, and receive voice data from, the mobile units.

14. A method of testing a mobile communications system, comprising:
    requesting access to the mobile communications system with one or more mobile units; and varying strengths of signals transmitted by the mobile units, using a signal processing device, to simulate movement of the mobile units.

15. The method of claim 14, further comprising providing movement patterns of the one or more mobile units.

16. The method of claim 15, further comprising converting the movement patterns into control signals sent to the signal processing device.

17. The method of claim 16, wherein the converting includes converting the movement patterns into control signals sent to an array of attenuators.

18. The method of claim 14, further comprising providing a command to request access to the mobile communications system to the one or more mobile units over a link.

19. An apparatus for testing a wireless communications system, comprising:
   a plurality of units capable of transmitting communications signals for receipt by the wireless communications system; and
   a signal processing element responsive to control signals to vary strengths of the communications signals from the units before transmission of the communications signals to the wireless communications system.

20. The apparatus of claim 19, further comprising one or more antennas, wherein the signal processing element includes a first set of ports coupled to the units and a second set of ports coupled to the one or more antennas for communicating with the wireless communications system.

21. The apparatus of claim 20, wherein the signal processing element includes an array of attenuators.

22. The apparatus of claim 21, wherein one attenuator is provided between each of the first ports and each of the second ports.

23. The apparatus of claim 19, wherein the signal processing element includes an array of attenuators.

24. An article including one or more storage media containing instructions for testing a wireless communications system, the instructions when executed causing a test system to:
   receive representations of movement patterns of real mobile units in a test operation; and
   translate the representations of movement patterns to control signals provided to a signal processing device to vary strengths of signals transmitted by the mobile units for receipt by the wireless communications system.

25. The article of claim 24, wherein the one or more storage media contain instructions that when executed further cause the test system to send a command to one of the mobile units to request an access to the wireless communications system.

26. The article of claim 25, wherein the one or more storage media contain instructions that when executed further cause the test system to send a command to one of the mobile units to dial a predetermined number.

27. The article of claim 25, wherein the one or more storage media contain instructions that when executed further cause the test system to send a command to one of the mobile units to terminate a call with the wireless communications system.

\* \* \* \* \*